United States Patent Office 3,094,512
Patented June 18, 1963

3,094,512
PROCESS FOR THE PREPARATION OF LOW VINYL LOW TRANS CONTENT RANDOM COPOLYMER
James N. Short, Bartlesville, Okla., assignor to Phillips Petroleum Company, a corporation of Delaware
No Drawing. Filed Dec. 31, 1959, Ser. No. 863,076
4 Claims. (Cl. 260—83.7)

This invention relates to a new method of preparing low vinyl, low trans content random copolymers.

It is known that organolithium compounds can be employed as catalysts for the polymerization of conjugated dienes either alone or with copolymerizable monomers such as vinyl-substituted aromatic hydrocarbons. It has been observed that when such catalysts are used in systems comprising mixtures of monomers of the foregoing types in the presence of a hydrocarbon diluent, the polymerization leads to the formation of block polymers. While such polymers are useful in certain applications, it is desirable for other uses to obtain polymers of the random type. One expedient heretofore employed for the production of such random copolymers comprises incorporation of greater or lesser amounts of a polar solvent such as an ether along with the hydrocarbon diluent. When operating in the presence of a polar solvent, the polymer obtained is characterized by the presence of numerous vinyl groups in the molecular configuration, frequently as high as 70 percent or more of those theoretically possible. Such products have specific applications in the polymer art but to fulfill the requirements of certain other applications, e.g., tire construction, polymers having a low vinyl content are more desirable.

The following are objects of this invention.

An object of this invention is to provide a new method of preparing random copolymers of conjugated dienes and vinyl-substituted aromatic compounds. A further object of this invention is to provide a new process of preparing 1,3-butadiene/styrene random copolymers. A further object of this invention is to provide a new process of preparing isoprene/styrene copolymers. A further object of this invention is to provide a process of producing such polymers using an organolithium catalyst. A further object of this invention is to provide such copolymers containing low vinyl and low trans content.

Other objects and advantages of this invention will be apparent to one skilled in the art upon reading the accompanying disclosure.

Broadly, my invention resides in a process for preparing a random copolymer which comprises charging to a polymerization zone containing a catalyst of the formula $R(Li)_x$, where R is a hydrocarbon radical selected from the group consisting of aliphatic, cycloaliphatic, and aromatic radicals and a hydrocarbon diluent, a conjugated diene of 4 to 5 carbon atoms and simultaneously a vinyl-substituted aromatic hydrocarbon in which said vinyl group is attached to a nuclear carbon atom, said monomers being charged at a rate less than the normal polymerization rate of the system under the conditions employed.

The rubbery products prepared by this system are random copolymers with not more than 2 percent by weight of a block polymer of the vinyl-substituted aromatic compound. Frequently the copolymers have zero block content. They have a vinyl content less than 20% and a trans content less than 60%. Cis content is in the range of 30 to 95% based on the diene polymer portion of the polymer. Butadiene/styrene copolymers come within the range vinyl, 5–15%; cis, 30–60%; and trans, 30–60%. Isoprene/styrene copolymers have vinyl (predominantly 3,4-addition), 5–20%; cis, 80–95%; and trans, 0–15%. The products have excellent low temperature properties and high abrasion resistance as evidenced by road performance in tire treads. Liquid copolymers can also be prepared by this process.

The rate of addition of the monomers is regulated in a manner such that complete reaction occurs as the addition proceeds, i.e., the rate of addition is preferably somewhat less than the normal polymerization rate of such a system at the temperature employed. When so operating, the polymerization reaction will be substantially complete at the close of the charging period. It has been found that by operating at a temperature in the range between 70 and 200° C. and adding from 1/10 to 1/300 of the weight of the total monomer charge per minute, polymerization can be effected at a commercially accepable rate, i.e., from 10 minutes to 5 hours. Since the rate of polymerization is a function of the temperature of the system, the rate of addition of monomers will be increased as the temperature is elevated. For any particular system, it is necessary to make a series of runs to determine the particular polymerization rate before practicing my invention.

One of the most important features of the invention is that the monomers must be charged at a controlled rate. They can be mixed prior to charging or they can be charged simultaneously in separate streams. This controlled charging of monomers leads to the formation of random copolymers rather than block polymers. It is preferred that both monomers and diluent as well as the catalyst be substantially free from polar impurities since it is by substantial exclusion of polar compounds that polymers having a low vinyl content can be obtained.

The rate of addition of monomers is governed by the temperature employed since the polymerization rate is a function of the temperature. Temperatures are generally in the range from 70 to 200° C. with 100 to 150° C. being preferred. Lower rates than the maximum polymerization rate at any temperature can, of course, be used. It is to be understood that the rate of addition of monomers is low compared to the rate of polymerization at the temperature chosen. Polymerization will take place almost instantaneously upon contact of the monomer mixture with the catalyst.

Conjugated dienes which are used in preparing the low vinyl random copolymers of this invention are 1,3-butadiene, 2-methyl-1,3-butadiene (isoprene), and 1,3-pentadiene (piperylene). Vinyl-substituted aromatic hydrocarbons which can be copolymerized with the conjugated dienes include styrene, 3-vinyltoluene, 4-ethylstyrene, 1-vinylnaphthalene, 2-vinylnaphthalene, 4-vinyltoluene, and the like. The term "vinyl" is used generically to include vinyl and substituted vinyl groups. With 1,3-butadiene only vinyl groups are obtained while substituted vinyl groups can result with the other dienes. For instance, taking isoprene as an example, vinyl groups are present as a result of 1,2-addition while 3,4-addition produces alpha-methylvinyl groups. In fact, with isoprene 3,4-addition occurs to a greater extent than 1,2-addition.

The amount of conjugated diene employed for preparing rubbery copolymers is in the range from 50 to 95 parts by weight per 100 parts total monomers with the copolymerizable monomer being in the range from 50 to 5 parts by weight per 100 parts total monomers. It is to be understood that the invention is applicable to mixtures of conjugated dienes as well as to mixtures of copolymerizable monomers, and when it is desired to prepare products other than rubbers, it is not necessary to keep within the above-specified ranges.

Organolithium compounds used as catalysts have the formula $R(Li)_x$ wherein R is a hydrocarbon radical selected from the group consisting of aliphatic, cycloaliphatic, and aromatic radicals and $x$ is an integer from 1 to 4, inclusive. The R in the formula preferably contains from 1 to 20 carbon atoms although it is within the scope of the invention to use higher molecular weight compounds. Examples of these compounds include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,2-dilithio-1,2-diphenylethane, 1,2-dilithio-1,8-diphenyloctane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The amount of catalyst used can vary over a wide range. It will generally be in the range from 0.3 to 100 milliequivalents of organolithium compound per 100 parts by weight of total monomers charged with from 0.6 to 15 milliequivalents of organolithium compound per 100 parts monomers being preferred. The amount of catalyst will be determined by the type of polymer desired, smaller amounts being used for the production of rubber than for liquid polymers.

The process is carried out in the presence of a hydrocarbon diluent selected from the group consisting of aromatic hydrocarbons, paraffins and cycloparaffins. The preferred hydrocarbons of these types are paraffins and cycloparaffins containing from 3 to 12, inclusive, carbon atoms per molecule. Examples of diluents which can be used include propane, isobutane, n-pentane, isooctane, n-dodecane, cyclopentane, cyclohexane, methylcyclohexane, benzene, toluene, xylene, ethylbenzene, and the like. Mixtures of two or more of these hydrocarbon diluents can be used.

The amount of diluent employed in the process of the invention depends upon the molecular weight of the polymer being prepared as well as upon the particular diluent employed. It is important that good contact of the monomers being added with the active polymer be maintained. A broad range for the diluent is 200 to 2000 parts by weight per 100 parts monomers with 300 to 1500 parts being a preferred range.

Various materials are known to be destructive to the organolithium catalyst of this invention. These materials include carbon dioxide, oxygen and water. It is highly desirable, therefore, that the monomers be free of these materials as well as other materials which tend to inactivate the catalyst. Any of the known means for removing such contaminants can be used. Also, it is preferred that the diluent used in the process be substantially free of impurities such as water, oxygen, and the like. In this connection, it is desirable to remove air and moisture from the reaction vessel in which the polymerization is carried out. Although it is preferred to carry out the polymerization under anhydrous or a substantially anhydrous condition, it is to be understood that some water can be tolerated in the reaction mixture. However, the amount of water which can be tolerated in the mixture is insufficient to completely inactivate the catalyst.

After the polymerization has been carried out to the desired degree, the catalyst remaining can be deactivated by the addition of material such as ethyl alcohol, isopropyl alcohol, or the like. It is generally preferred to add only an amount of the catalyst deactivating material which is sufficient to deactivate the catalyst without causing precipitation of the dissolved polymer. It has also been found to be advantageous to add an antioxidant, such as phenyl-beta-naphthylamine, to the polymer solution prior to precipitation of the polymer. After addition of the catalyst deactivating agent and the antioxidant, the polymer present in the solution can then be precipitated by the addition of an excess of a material such as ethyl alcohol or isopropyl alcohol. It is to be understood, however, that deactivation of the catalyst and precipitation of the polymer can be accomplished in a single step. The precipitated polymer can then be recovered by filtration, decantation, and the like. In order to purify the polymer, the separated polymer can be redissolved in a suitable solvent and again precipitated by addition of an alcohol. Thereafter, the polymer is again recovered by separation steps, as indicated hereinbefore, and dried. Any suitable hydrocarbon solvent, such as mentioned hereinbefore, can be used in this purification step to redissolve the polymer. The diluent and alcohol can be separated, for example, by fractional distillation, and reused in the process.

As hereinbefore mentioned, it is within the scope of the invention to utilize an antioxidant. The antioxidant can be added to the reaction mixture prior to precipitation of the polymer, to the solution of redissolved polymer, or to the diluent in which the polymer is to be subsequently redissolved.

In the present process, the polymerization can be carried to very high conversions, even to 100 percent, with the production of gel-free products.

The following examples illustrate specific embodiments of my invention.

EXAMPLE I

A mixture of 1,3-butadiene and styrene was co-polymerized in a one-gallon reactor in accordance with the following recipe:

| | Parts by weight [1] |
|---|---|
| 1,3-butadiene | 75 |
| Styrene | 25 |
| Cyclohexane | 780 |
| n-Butyllithium, mmoles [2] | 4.0 |
| Temperature, °C | 120 |
| Time, hours | 1 |
| Conversion, percent | 100 |

[1] Except for n-butyllithium.
[2] Used as an 0.975 molar solution in n-pentane.

The actual quantities of materials charged were:

| | |
|---|---|
| Butadiene, grams | 150 |
| Styrene, grams (55 ml.) | 50 |
| Cyclohexane, ml | 2000 |
| n-Butyllithium, 0.975 molar solution in n-pentane, ml | 8.1 |

Cyclohexane was charged to the reactor after which it was purged with nitrogen at room temperature (about 30° C.) for 15 minutes at the rate of 3 liters per minute. The butyllithium solution was introduced, the reactor contents were brought up to temperature (120° C.), and the butadiene/styrene mixture was added, with stirring, over a one-hour period. The reactor contents were poured into isopropanol containing a small quantity of phenyl-beta-naphthylamine as the antioxidant. The polymer which coagulated was separated and dried in a vacuum oven. It had the following properties:

| | |
|---|---|
| Inherent viscosity | 1.05 |
| Gel, percent | 0 |
| Refractive index @ 25° C | 1.5387 |
| Polystyrene, percent [1] | 0 |
| Infrared analysis: [2] | |
| Cis, percent | 53 |
| Trans, percent | 36 |
| Vinyl, percent | 11 |

[1] Determined by oxidative degradation procedure. Approximately 0.5 gram of the polymer was cut into small pieces, weighed to within one milligram, and charged to a 125 ml. flask. Forty to fifty grams of p-dichlorobenzene was then charged to the flask and the contents were heated to 130° C. and maintained at this temperature until the polymer had dissolved. The mixture was cooled to 80 to 90° C., 8.4 ml. of a 71.3 percent by weight aqueous solution of tert-butyl hydroperoxide was added followed by 1 ml. of 0.003 molar osmium tetroxide in toluene. The mixture was heated to between 110 and 115° C. for 10 minutes, then cooled to between 50 and 60° C., 20 ml. of toluene was added, and the solution was poured slowly into 250 ml. of ethanol containing a few drops of concentrated sulfuric acid. This treatment causes any polystyrene present to coagulate, after which it can be recovered, dried, and weighed.
[2] Results are based on the butadiene portion. Results based on the total polymer are: cis, 40%; trans, 27%; vinyl, 8%.

The results demonstrate that when operating in the manner described, a polymer with low vinyl content is obtained. It is essentially a random copolymer as evidenced by the fact that oxidative degradation yielded no polystyrene.

EXAMPLE II

A mixture of butadiene and styrene was co-polymerized in a series of runs in a 1-gallon reactor using the procedure of Example I. The products obtained in each of the runs were blended. The butadiene/styrene monomer ratio was 77/23 and the polymerization was carried out at 120° C. The following table gives the recipes used and results obtained:

Table

| Run No. | Cyclohexane, parts by weight | n-Butyllithium, mmoles | Conv. | Monomer charge, grams | Time of monomer addition, minutes | ML-4 at 212° F. | Inherent visc. | Refractive index at 25° C. | Gel, percent | Polymer used in blend, grams |
|---|---|---|---|---|---|---|---|---|---|---|
| 1 [1] | 675 | 2.0 | 90 | 300 | 20 | 65 | 1.85 | 1.5356 | | 257 |
| 2 | 675 | 2.0 | 100 | 300 | 22 | 35 | 0.86 | 1.5352 | 3 | 262 |
| 3 | 675 | 1.85 | 91 | 300 | 20 | 66 | 1.92 | 1.5352 | 10 | 246 |
| 4 | 675 | 1.95 | 92 | 300 | 14 | 62 | 1.93 | 1.5355 | 0 | 228 |
| 5 | 675 | 2.10 | 89 | 300 | 18 | 40 | 1.76 | 1.5359 | 0 | 231 |
| 6 | 1,100 | 1.95 | 93 | 200 | 13 | 60 | 2.23 | 1.5359 | 0 | 155 |
| 7 | 1,100 | 1.95 | 91 | 200 | 12 | 67 | 1.64 | 1.5362 | 0 | 154 |
| 8 | 1,100 | 2.00 | 93 | 200 | 12 | 32 | 1.43 | 1.5388 | 0 | 148 |
| 9 | 1,100 | 1.95 | 93 | 200 | 12 | 57 | 1.42 | 1.5355 | 0 | 172 |
| 10 | 1,100 | 1.90 | 90 | 200 | 12 | 73 | 1.56 | 1.5357 | 0 | 159 |
| 11 | 1,100 | 1.90 | 97 | 200 | 13 | 89 | 1.77 | 1.5353 | 0 | 163 |
| 12 | 1,100 | 1.85 | 92 | 200 | 13 | 29 | 1.29 | 1.5353 | 0 | 157 |
| 13 | 1,100 | 1.85 | 95 | 200 | 13 | 53 | 1.50 | 1.5353 | 0 | 170 |
| 14 | 1,100 | 1.85 | 92 | 200 | 13 | 13 | 1.20 | 1.5354 | 0 | 170 |
| 15 | 1,100 | 1.85 | 93 | 200 | 13 | 26 | 1.24 | 1.5352 | 0 | 170 |
| 16 | 1,100 | 1.85 | 94 | 200 | 13 | 85 | 1.81 | 1.5356 | 0 | 181 |
| 17 | 1,100 | 1.85 | 92 | 200 | 14 | 17 | 1.33 | 1.5351 | 0 | 171 |
| 18 | 1,100 | 1.85 | 93 | 200 | 13 | 41 | 1.35 | | 0 | 170 |
| 19 | 1,100 | 1.80 | 93 | 200 | 13 | 81 | 1.65 | 1.5352 | 0 | 168 |

[1] Infrared analysis gave the following results (based on the butadiene portion of the polymer: cis, 35 percent; trans, 55 percent; vinyl, 10 percent.

Products from the various runs were blended on a roll mill at 225° F. Forty-seven grams of phenyl-beta-naphthylamine was added on the mill. The blend had a raw Mooney value of 44 and a polystyrene content (determined by oxidative degradation) of 1.5 percent. This rubber and a butadiene/styrene rubber prepared by emulsion polymerization at 41° F. (20 percent bound styrene; 52 ML-4 at 212° F.) were compounded in accordance with the following formulations:

| | A | B |
|---|---|---|
| Polymer blend | 100 | |
| Emulsion copolymer | | 100 |
| Philblack O [1] | 50 | 50 |
| Zinc oxide | 3 | 3 |
| Stearic acid | 1 | 1 |
| Flexamine [2] | 1 | 1 |
| Philrich 5 [3] | 10 | 10 |
| Sulfur | 1.75 | 1.75 |
| NOBS special [4] | 1.2 | |
| Santocure [5] | | 1.2 |
| Raw ML-4 at 212° F | 44 | 52 |

Cured 30 Minutes at 307° F.

| | | |
|---|---|---|
| Compression set, percent | 21.7 | 18.7 |
| 300-percent modulus, p.s.i. | 1,280 | 1,400 |
| Tensile, p.s.i. | 3,030 | 3,800 |
| Elongation, percent | 560 | 620 |
| ΔT, ° F. | 61.2 | 60.8 |
| Resilience, percent | 69.4 | 61.4 |
| Flex life, M [6] | 24.0 | 14.3 |
| Shore A hardness | 62 | 59.5 |
| Tear strength, lb./in | 330 | 325 |
| Gehman freeze point, ° C | −67 | −46 |

[1] High abrasion furnace black.
[2] Physical mixture containing 65 percent of a complex diarylamine-ketone reaction product and 35 percent of N,N'-diphenyl-p-phenylenediamine.
[3] Highly aromatic oil.
[4] N-oxydiethylene-2-benzothiazylsulfenamide.
[5] N-cyclohexyl-2-benzothiazylsulfenamide.
[6] Thousands of flexures to failure.

The low freeze point of the n-butyllithium polymerized rubber is indicative of the superiority of this rubber over emulsion polymerized rubber in low temperature properties.

The foregoing rubber compounds were use to make retreads on 7.60 x 15 tire carcasses. The following results were obtained after the tires were run 6,160 miles:

| Tire tread | Miles/0.001" wear | Rating | Tread cracking |
|---|---|---|---|
| n-Butyllithium rubber | 110 | 109 | None. |
| Emulsion polymerized rubber | 101.3 | 100 | Do. |

EXAMPLE III

Two runs have been made to show the effect of charging the monomers initially. Runs were made at two catalyst levels. Recipes were as follows:

| | Parts by weight [1] | |
|---|---|---|
| | A | B |
| 1,3-butadiene | 77 | 77 |
| Styrene | 23 | 23 |
| Cyclohexane | 1,170 | 1,170 |
| n-Butyllithium, mmoles [2] | 1.5 | 2.0 |
| Temperature, ° F | 240–250 | 240–250 |
| Time, minutes | 15 | 15 |
| Conversion, percent | 85 | 99 |

[1] Except for n-butyllithium.
[2] Used as an 0.975 molar solution in n-pentane.

Cyclohexane was charged to the reactor after which it was purged with nitrogen at room temperature (about 30° C.) for 15 minutes at the rate of 3 liters per minute. The butyllithium solution was introduced, the reactor contents were brought to a temperature of 240° F., and the butadiene and styrene were added all at once. The reactants were stirred. A very rapid reaction occurred and no pressure rise was observed. The reactor contents were poured into isopropanol containing a small quantity of phenyl-beta-naphthylamine as the antioxidant. The coagulated polymer was separated and dried in a vacuum oven. Polymers from each of the runs have the following properties:

| | A | B |
|---|---|---|
| Inherent viscosity | 1.1 | 0.9 |
| Gel, percent | 0 | 0 |
| Refractive index at 25° C | 1.5339 | 1.5335 |
| Polystyrene, percent [1] | 16 | 14.5 |
| ML-4 at 212° F | 67 | 30 |

[1] Determined by oxidative degradation procedure.

The foregoing runs show that block polymers are formed when all the monomers are charged initially.

These results are offered in contrast to those given in Example I which show that random copolymers are produced by slow addition of the monomers.

EXAMPLE IV

A mixture of isoprene and styrene was polymerized in a series of runs. In three of the runs the monomers were added slowly while in the remaining runs they were added all at once. The following table shows polymerization recipes and results obtained:

|  | Parts by weight [1] | | | | | |
| --- | --- | --- | --- | --- | --- | --- |
|  | A | B | C | D | E | F |
| Isoprene | 70 | 70 | 70 | 70 | 70 | 70 |
| Styrene | 30 | 30 | 30 | 30 | 30 | 30 |
| Cyclohexane | 1,170 | 1,170 | 1,170 | 1,170 | 1,170 | 1,170 |
| n-Butyllithium, mmoles | 2.85 | 2.5 | 1.5 | 3.5 | 2.5 | 1.5 |
| Temperature, °F | 240–250 | 240–250 | 240–250 | 240–250 | 240–250 | 240–250 |
| Time of monomer addition, minutes | 55 | 59 | 51 | 0 | 0 | 0 |
| Polymerization time, minutes | 55 | 59 | 51 | 15 | 15 | 15 |
| Inherent viscosity | 1.0 | 1.2 | 2.1 | 1.4 | 0.55 | 0.82 |
| Gel, percent | 0 | 0 | 0 | 0 | 0 | 0 |
| Refractive index at 25° C | 1.5423 | 1.5415 | 1.5423 | 1.5401 | 1.5410 | 1.5401 |
| Polystyrene, percent [2] | 0 | 0 | 0 | 15.5 | 14.0 | 16.9 |

[1] Except for n-butyllithium.
[2] Determined by oxidative degradation procedure.

These data show that when the mixture of monomers was added slowly, random copolymers were formed (first three runs) while block copolymers were produced in the runs in which all of the monomers were charged initially (last three runs).

EXAMPLE V

Recipe B of Example III was employed for the copolymerization of butadiene with styrene. Actual quantities of materials charged were as follows:

| | |
| --- | --- |
| 1,3-butadiene, grams | 33.8 |
| Styrene, grams | 10.2 |
| Cyclohexane, ml | 720 |
| n-Butyllithium, mmoles | 0.88 |

Cyclohexane was charged first. The reactor was purged with nitrogen, the temperature adjusted to 120° C., n-butyllithium was charged, and the monomer mixture added over a 26-minute period. The rate of addition was 1.70 grams per minute. Five minutes polymerization time was allowed after addition of the monomers was completed. The reaction mixture was cooled and discharged into a small amount of isopropanol to inactivate the initiator. The polymer was coagulated with isopropanol and dried. It had the following properties:

| | |
| --- | --- |
| Inherent viscosity | 1.51 |
| Gel, percent | 0 |
| Refractive index at 25° C | 1.5334 |
| Polystyrene, percent [1] | 0 |
| ML–4 at 212° F | 24 |
| Infrared analysis (based on butadiene portions): | |
|    Cis, percent (by difference) | 36.8 |
|    Trans, percent | 54.1 |
|    Vinyl, percent | 9.1 |

[1] Determined by oxidative degradation procedure.

These runs demonstrate again that the slow addition of monomers gives a polymer with low vinyl content. It is a random copolymer as evidenced by the fact that no polystyrene was found when it was subjected to oxidative degradation.

EXAMPLE VI

Three runs were made for the copolymerization of isoprene with styrene at 120° C. The following recipe was employed:

| | Parts by weight [1] |
| --- | --- |
| Isoprene | 70 |
| Styrene | 30 |
| Cyclohexane | 1170 |
| n-Butyllithium | Variable |

[1] Except for n-butyllithium.

Cyclohexane was charged first after which the reactor was purged with nitrogen and the temperature regulated at 120° C. n-Butyllithium was added followed by the mixture of monomers. The following table shows the total monomers charged, rate of addition, total time of addition, and initiator level:

| Run No. | Total monomer charge, grams | Rate of monomer addition, g./min. | Time of monomer addition, min. | Initiator level, mhm.[1] |
| --- | --- | --- | --- | --- |
| 1 | 77.5 | (²) | (²) | 2.07 |
| 2 | 82.6 | 1.57 | .53 | 1.70 |
| 3 | 100.3 | 1.39 | .72 | 1.90 |

[1] Millimoles per 100 grams monomer.
[2] Monomers added as rapidly as possible, approximately 15 seconds being required.

Properties of the polymers were as follows:

| Run No. | Refractive index at 25° C. | ML–4 at 212° F. | Polystyrene, percent [1] | Inherent viscosity | Gel, percent |
| --- | --- | --- | --- | --- | --- |
| 1 | 1.5400 | 30.0 | 21.3 | 0.85 | 0 |
| 2 | 1.5398 | 28.0 | 1.0 | 1.52 | 0 |
| 3 | 1.5400 | 26.2 | 0 | 1.60 | 0 |

[1] Determined by oxidative degradation procedure.

These results show that the rapid monomer addition in run 1 gave a block copolymer (21.3% polystyrene found) whereas the products from runs 2 and 3 were essentially random copolymers. The structure of all of the copolymers was within the ranges: vinyl (mostly 3,4-addition), 5–20%; cis, 80–95%; and trans, 0–15%.

In the examples, the structure was determined by an infrared examination.

The polymers were dissolved in carbon disulfide to form a solution having 25 grams of polymer per liter of solution. The infrared spectrum of each of the solutions (percent transmission) was then determined in a commercial infrared spectrophotometer (a Perkin-Elmer Model 21 spectrophotometer was used). The amounts of trans and vinyl were determined. The cis content was determined by difference. The results obtained were based on the total polymer and were then calculated in terms of the butadiene portion. (See Example I for both methods of reporting the results.) The values are all expressed as weight percent.

The percent of the total unsaturation present as trans-1,4 was calculated according to the following equation and consistent units:

$$\epsilon = \frac{E}{tc}$$

where $\epsilon$ = extinction coefficient (liters-mols$^{-1}$-centimeters$^{-1}$); $E$ = extinction ($\log I_0/I$); $t$ = path length (centimeters); and $c$ = concentration (mols double bond/liter). The extinction was determined at the 10.35 micron band and the extinction coefficient was 126 (liters-mols$^{-1}$-centimeters$^{-1}$).

The percent of the total unsaturation as 1,2-(or vinyl) was calculated according to the above equation, using the 11.0 micron band and an extinction coefficient of 173 (liters-mols$^{-1}$-centimeters$^{-1}$).

From the values for trans and vinyl, and the amount of styrene assumed to be present, the value for cis was obtained by difference.

It will be apparent to those skilled in the art that variations and modifications can be made in the light of the foregoing disclosure. Such variations and modifications are believed to be clearly within the spirit and scope of the invention.

I claim:
1. A process for preparing a random copolymer which comprises charging to a polymerization zone containing a catalyst of the formula $R(Li)_x$ where $x$ is an integer from 1 to 4, R is a hydrocarbon radical selected from the group consisting of aliphatic, cycloaliphatic, and aromatic radicals and a hydrocarbon diluent, a conjugated diene of 4 to 5 carbon atoms and simultaneously a vinyl-substituted aromatic hydrocarbon in which said vinyl group is attached to a nuclear carbon atom, said monomers being charged at a rate less than the normal polymerization rate of the system under the conditions employed.

2. A process for preparing a random copolymer which comprises using the following recipe

| | Parts by weight |
|---|---|
| 1,3-diene | 50–95 |
| Vinyl-substituted aromatic compound | 50–5 |
| Hydrocarbon diluent | 200–2000 | wherein the vinyl group on said aromatic compound is attached to a nuclear carbon atom and the amounts of monomers add to 100 parts, in the presence of 0.3 to 100 milliequivalents of a catalyst of the formula $R(Li)_x$ where $x$ is an integer from 1 to 4, R is a hydrocarbon radical selected from the group consisting of aliphatic, cycloaliphatic, and aromatic radicals and a temperature of 70 to 200° C., said monomers being simultaneously charged to the polymerization zone containing said catalyst at a rate less than the normal polymerization rate of the system under the conditions employed.

3. A process for preparing a random copolymer which comprises charging to a polymerization zone containing an n-butyllithium catalyst and cyclohexane, 1,3-butadiene and styrene, said monomers being simultaneously charged at a rate less than the normal polymerization rate of the system under the conditions employed.

4. A process for preparing a random copolymer which comprises charging to a polymerization zone containing an n-butyllithium catalyst and cyclohexane, isoprene and styrene, said monomers being simultaneously charged at a rate less than the normal polymerization rate of the system under the conditions employed.

References Cited in the file of this patent
UNITED STATES PATENTS

| 2,527,768 | Schulze | Oct. 31, 1950 |
| 2,849,432 | Kibler | Aug. 26, 1958 |

FOREIGN PATENTS

| 543,292 | Belgium | June 2, 1956 |
| 817,695 | Great Britain | Aug. 6, 1959 |
| 1,218,060 | France | Dec. 14, 1959 |

OTHER REFERENCES

Binder: "Industrial and Engineering Chemistry," vol. 46, No. 8, pp. 1727–30, August 1954.